(12) United States Patent
Smith et al.

(10) Patent No.: US 9,634,538 B2
(45) Date of Patent: Apr. 25, 2017

(54) TERMINAL ASSEMBLY FOR REFRIGERATION COMPRESSOR

(71) Applicant: TRANE INTERNATIONAL INC., Piscataway, NJ (US)

(72) Inventors: Todd Wayne Smith, Onalaska, WI (US); Joel S. Duga, Onalaska, WI (US); Jon Christopher Johnson, New Albin, IA (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 14/448,772

(22) Filed: Jul. 31, 2014

(65) Prior Publication Data

US 2015/0038016 A1 Feb. 5, 2015

Related U.S. Application Data

(60) Provisional application No. 61/860,477, filed on Jul. 31, 2013.

(51) Int. Cl.
| | | |
|---|---|---|
| *H01R 4/70* | (2006.01) | |
| *H02K 5/22* | (2006.01) | |
| *H01R 101/00* | (2006.01) | |
| *H01B 17/30* | (2006.01) | |
| *H01R 12/58* | (2011.01) | |
| *H01B 17/58* | (2006.01) | |

(52) U.S. Cl.
CPC ............ *H02K 5/225* (2013.01); *H01R 4/70* (2013.01); *H01B 17/303* (2013.01); *H01B 17/58* (2013.01); *H01R 12/58* (2013.01); *H01R 2101/00* (2013.01); *Y10T 29/49204* (2015.01)

(58) Field of Classification Search
CPC ...... H01B 17/303; H01B 17/20; H01B 17/58; H01B 17/583; H01R 11/284; H01R 11/287; H01M 2/065
USPC ...... 174/138 F, 137 R, 138 R, 142; 439/926, 439/892, 625, 737–738, 750, 873, 876, 439/886–888, 935, 271–274
See application file for complete search history.

(56) References Cited

U.S. PATENT DOCUMENTS

| | | | |
|---|---|---|---|
| 2,418,729 A | 4/1947 | Schemers | |
| 2,579,973 A | 12/1951 | Schlosser | |
| 3,906,149 A * | 9/1975 | Hashoff | H02G 5/068 174/167 |
| 4,252,394 A | 2/1981 | Miller | |
| 4,800,732 A | 1/1989 | Newton | |
| 5,037,333 A | 8/1991 | Baubles | |
| 5,639,268 A * | 6/1997 | Julian | H01M 2/20 439/737 |
| 6,028,523 A | 2/2000 | Thibodeaux et al. | |
| 6,084,324 A | 7/2000 | Jeske | |

(Continued)

*Primary Examiner* — Felix O Figueroa
*Assistant Examiner* — Paul Baillargeon
(74) *Attorney, Agent, or Firm* — Hamre, Schumann, Mueller & Larson, P.C.

(57) ABSTRACT

A terminal assembly configured to conduct current from an external power source to a hermetical motor-compressor unit. The terminal assembly includes a terminal board, at least one opening defined through the thickness of the terminal board, at least a conductive pin received in the opening, and an insulator having a convoluted contour. The insulator may be disposed over the conductive pin and spaced away from the terminal board.

14 Claims, 7 Drawing Sheets

(56) References Cited

U.S. PATENT DOCUMENTS

| | | | |
|---|---|---|---|
| 6,368,451 B1 * | 4/2002 | Goulette | H01B 17/26 |
| | | | 118/715 |
| 6,372,993 B1 | 4/2002 | Eckels et al. | |
| 6,737,579 B1 | 5/2004 | Laufer et al. | |
| 2010/0196175 A1 * | 8/2010 | Bedell | F04B 39/12 |
| | | | 417/410.5 |

* cited by examiner

TERMINAL ASSEMBLY FOR REFRIGERATION COMPRESSOR

FIELD

This disclosure relates generally to electric terminal assemblies, and more particularly, but not by way of limitation, to terminal assemblies for refrigeration compressor motors.

BACKGROUND

Terminal assemblies are used to make an electrical connection for example between a motor component of a hermetic motor compressor unit and a plurality of conductive pins projecting into the housing of the motor compressor unit. For hermetically sealed electric conductive pins to function safely and effectively for their intended purpose, the conductive pins are required to be electrically insulated from and hermetically sealed to the terminal board through which they pass.

SUMMARY

Some embodiments of a terminal assembly are configured to include an insulator disposed over a conductive pin to electrically insulate the conductive pin from a terminal board where the conductive pin passes. The insulator is configured to have a convoluted contour to increase an over-surface distance between the conductive pin and the terminal board. For example, the insulator can take a form of a washer having an annular recess defined between a central opening and an outer surface of the washer. Moreover, the insulator is configured to electrically insulate against a side of the conductive pin and configured to increase a through-space distance between the conductive pin and the terminal board.

Particular embodiments include a terminal assembly configured to conduct current from an external power source to a hermetical motor-compressor unit. The terminal assembly includes a terminal board, at least one opening defined through the thickness of the terminal board, at least a conductive pin received in the opening, and an insulator having a convoluted contour. The insulator may be disposed over the conductive pin and spaced away from the terminal board.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Some embodiments of a terminal assembly are configured to include an insulator disposed over a conductive pin to electrically insulate the conductive pin from a terminal board where the conductive pin passes. The insulator is configured to have a convoluted contour to increase an over-surface distance between the conductive pin and the terminal board. For example, the insulator can take a form of a washer having an annular recess defined between a central opening and an outer surface of the washer. Moreover, the insulator is configured to electrically insulate against a side of the conductive pin to increase a through-space distance between the conductive pin and the terminal board.

As used herein, the term "over-surface distance" refers to a geodesic distance between two points in the refrigeration system, and the term through-space distance" refers to a shortest straight line between two points, such as between an conductor and ground.

The terms "above," "on," "top," "bottom," "up," "down," "front," "rear," "left," "right" and the like used herein are in reference to the relative positions of the terminal assembly and its constituent parts, as oriented in the specific figures being described. These terms are not meant to be limiting in any way.

Figure 1:
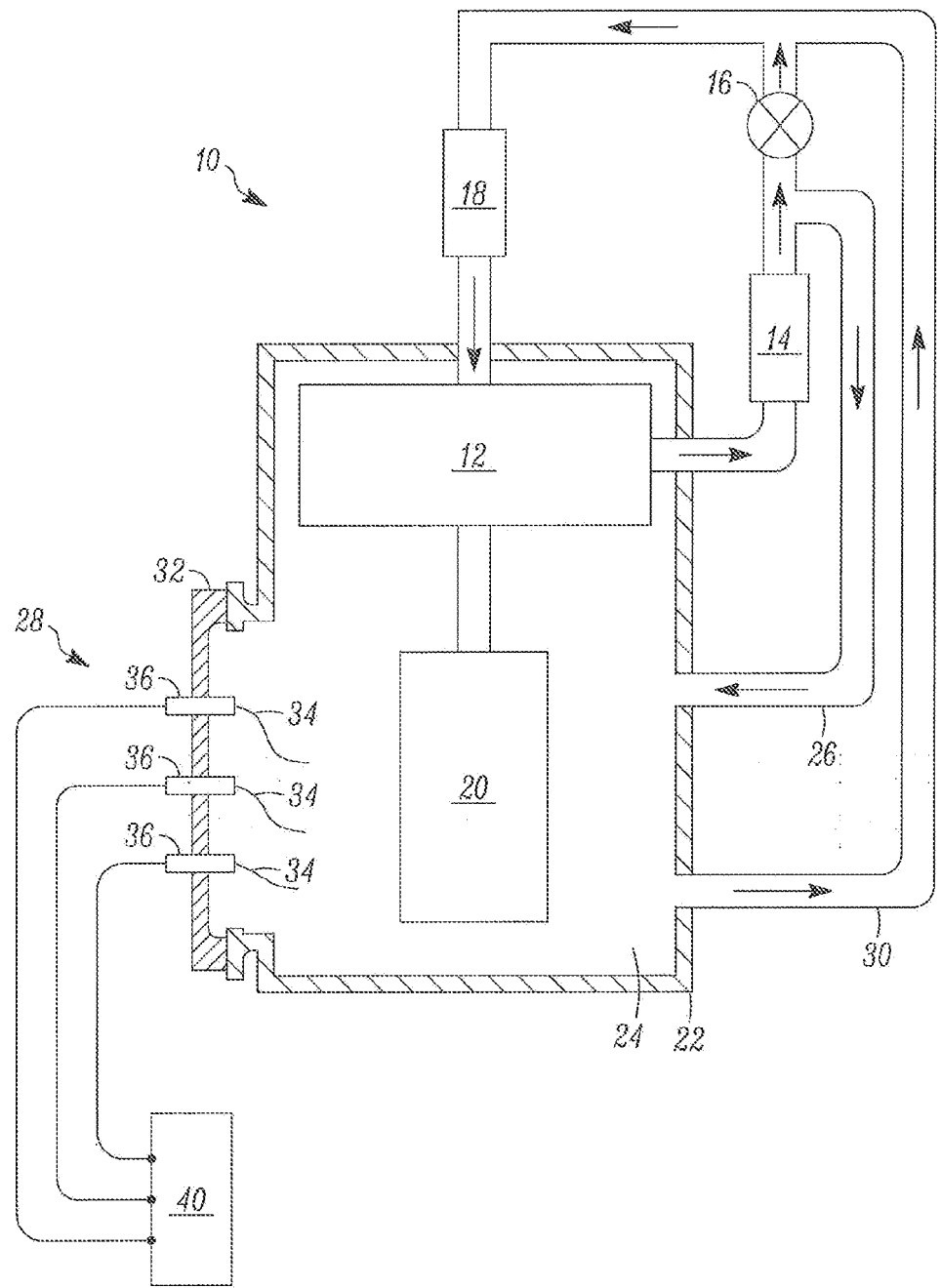
FIG. 1 is a schematic illustration of a refrigeration system.

Referring to FIG. 1, one embodiment of a refrigeration system 10 can include a compressor 12, a condenser 14, an expansion device 16, and an evaporator 18, connected in series and hermetically sealed. In some embodiments, an electric motor 20 drives the compressor 12. In the embodiment shown, both the electric motor 20 and the compressor 12 are contained in a common housing 22 that is hermetically sealed. The motor 20 is cooled by a flow of refrigerant 24 supplied via a supply line 26. After cooling the motor 20, the refrigerant returns to the refrigeration cycle through a discharge line 30. It is to be understood, however, that any refrigeration circuit that conveys refrigerant to the motor 20 is within the scope of this disclosure. In addition, as used herein the term "refrigerant" refers to compounds and chemicals that are suitable for use as heat-transfer fluids in, for example, refrigeration and air conditioning systems.

Referring to FIG. 1, a terminal assembly 28 is sealingly associated with the housing 22. The terminal assembly 28 helps provide for the electrical connection between an external power source 40 and the motor 20 by conducting current from the external power source 40 to the motor 20 over leads 34. The terminal assembly 28 can include an electrically conductive, generally plate shape terminal board 32. The terminal board 32 is disposed against the housing 22 in a manner such that the terminal board 32 will not be dislodged by high pressures that may be present within the housing 22 for example during system 10 operation. Conductive pins 36 which conduct current from the external power source 40 to the motor 20 project through a thickness of the terminal board 32 in both directions. It is to be understood that the conductive pins 36 can be any electrical conductor that can conduct current from the external power 40 to the leads 34.

In some embodiments, the terminal board 32 can be part of the housing 22, rather than a separate board. As used herein, the term "terminal board" refers to either a separate terminal board or a part of a motor housing, such as a wall of a motor housing, as long as it supports the conductive pins and allows the conductive pins to project through its thickness.

Figure 2:
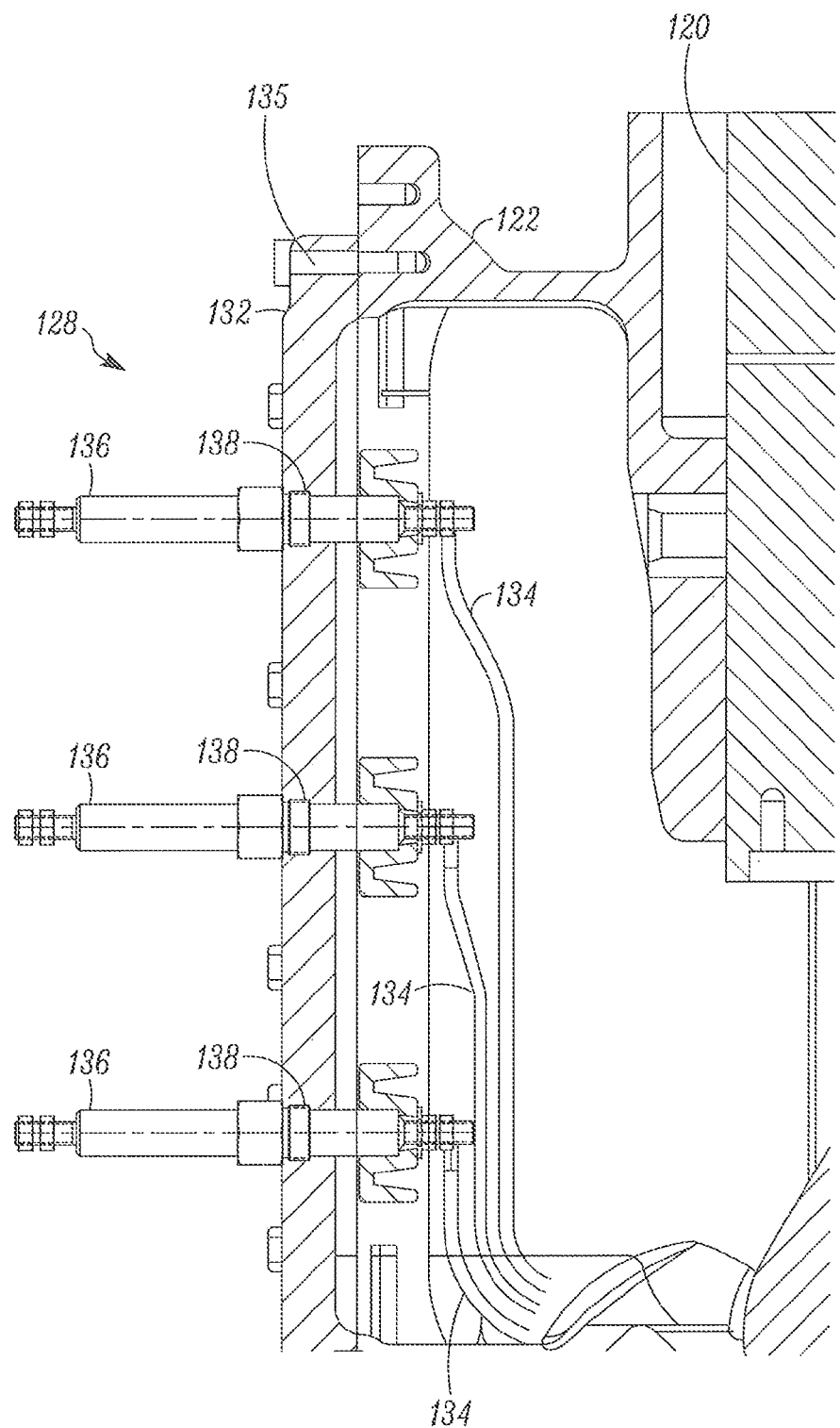
FIG. 2 is a cross section view of a terminal assembly employed by a refrigeration system.

Referring now to FIG. 2, a terminal assembly 128 is shown to be sealingly associated with the housing 122 by suitable sealing mechanisms. The terminal assembly 128 helps conduct current to the motor 120 over leads 134. In some embodiments, the terminal assembly 128 can be used to conduct electricity, for example, in the range of about 750-7200 volts. However, it is to be understood that the terminal assembly 128 can also be used to conduct other ranges of voltages that may be higher or lower than this range.

The terminal assembly 128 includes an electrically conductive, generally plate shaped terminal board 132. The terminal board 132 is disposed against the housing 122 in a manner such that the terminal board 132 will not be dislodged by high pressures that may be present within the housing 122. In the depicted embodiment as shown in FIG. 2, the terminal board 132 is fastened to the housing 122 by one or more screws or bolts 135 that mate with a complementary opening. It is to be understood that other types of fastening mechanisms may be employed, such as, but not limited to, latches, snap-fits, or the like. The terminals may also be installed directly through openings within a cast or fabricated motor housing, for example without the need of a separate terminal board. The terminal board 132 defines openings 138 through its thickness.

In some embodiments, the conductive terminal board 132 is a cast iron board. However, it is to be understood that the terminal board 132 can be made of other electrically conductive materials, such as, but not limited to, steel, aluminum, or other metallic alloys.

Each of the openings 138 is configured for receiving a respective conductive pin 136 which conducts current from an external power source to the motor 120. Each conductive pin 136 is positioned to project through the terminal board 132 in both directions. It is to be understood that the conductive pins 136 can be any electrical conductor that can conduct current from external power to the leads 134.

Figure 3A:
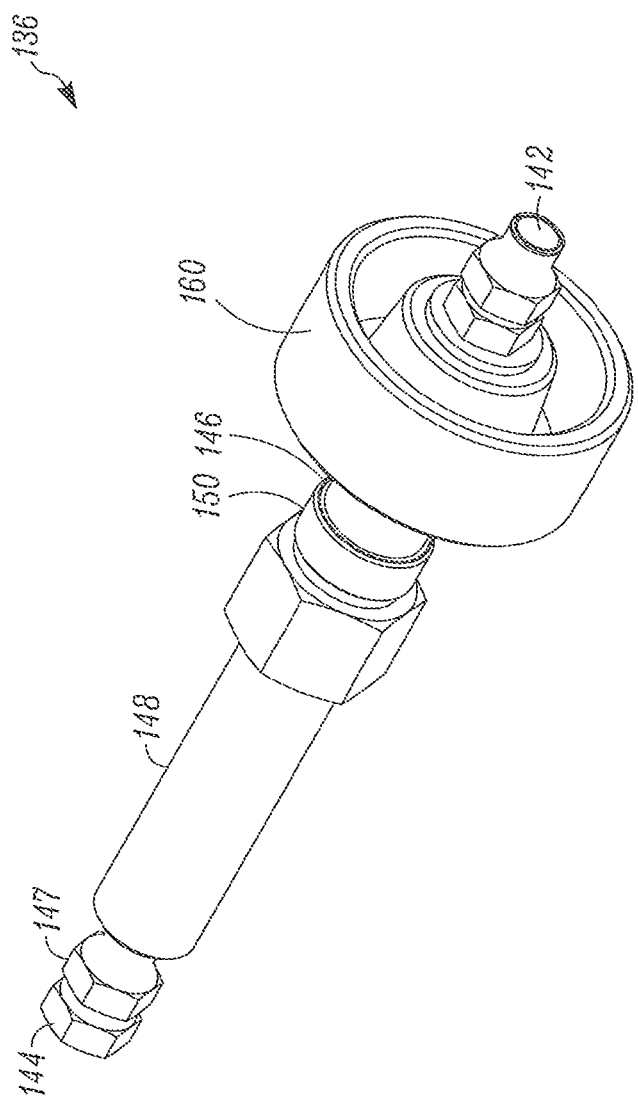
FIG. 3A is a perspective view of an embodiment of a conductive pin.

Referring to FIGS. 3A-B and 4-5, as shown in these views, one embodiment of the conductive pin 136 has an inner end 142 disposed inside the housing 122 (shown in FIG. 2) and an outer end 144 disposed outside the housing 122. An inner connection post 143 for connection with the motor 120 through the leads 134 is located at the inner end 142, and an outer connection post 145 for connection with the external power source is located at the outer end 144. The one or more nuts 147 can be threaded on the outer connection post 145 or the inner connection post 143. The conductive pin 136 also has an inner segment 146 disposed between the inner end 142 and the inner surface of the terminal board 132, an outer segment 148 disposed between the outer end 144 and the outer surface of the terminal board 132, and an intermediate segment 150 integral with the inner and outer segments 146, 148 and disposed primarily within the thickness of the terminal board 132. In the depicted embodiment, the conductive pin 136 includes a threaded portion 155 for attaching an insulator 160 to the conductive pin 136. It is to be understood that the specific implementation shown in FIG. 3A is exemplary and that other configurations of the conductive pin 136 can be employed to allow for assembly to the terminal board and to provide for the electrical connection between the external power source and the motor 120. In some embodiments, the insulator 160 can be secured to the conductive pin 136 by a force of torqueing the insulator 160 to create an electrically insulating contact between the insulator 160 and an outer surface of the conductive pin 136.

Still referring to FIGS. 3A-B and 4-5, the conductive pin 136 and the terminal board 132 are hermetically sealed. For example, in the depicted embodiment, the outer segment 148 includes a shoulder 152 to compress an O-ring 154 against the outer surface of the conductive pin 136 and the inner surface of the opening 138, thereby creating an electrical sealing engagement between the terminal board 132 and the conductive pin 136.

It is to be understood that the electrical seal can be created by any type of electrical sealing method for preventing refrigerant leaks, not only by O-rings, but also by gaskets, adhesives, compression fits, or combinations thereof.

In addition, the conductive pin 136 is electrically insulated from the terminal board 132 at the intermediate segment 150. Suitable materials for the insulation include various types of plastic or ceramic as long as the material has suitable strength, toughness, thermal capabilities, electrical insulation properties.

Figure 3B:
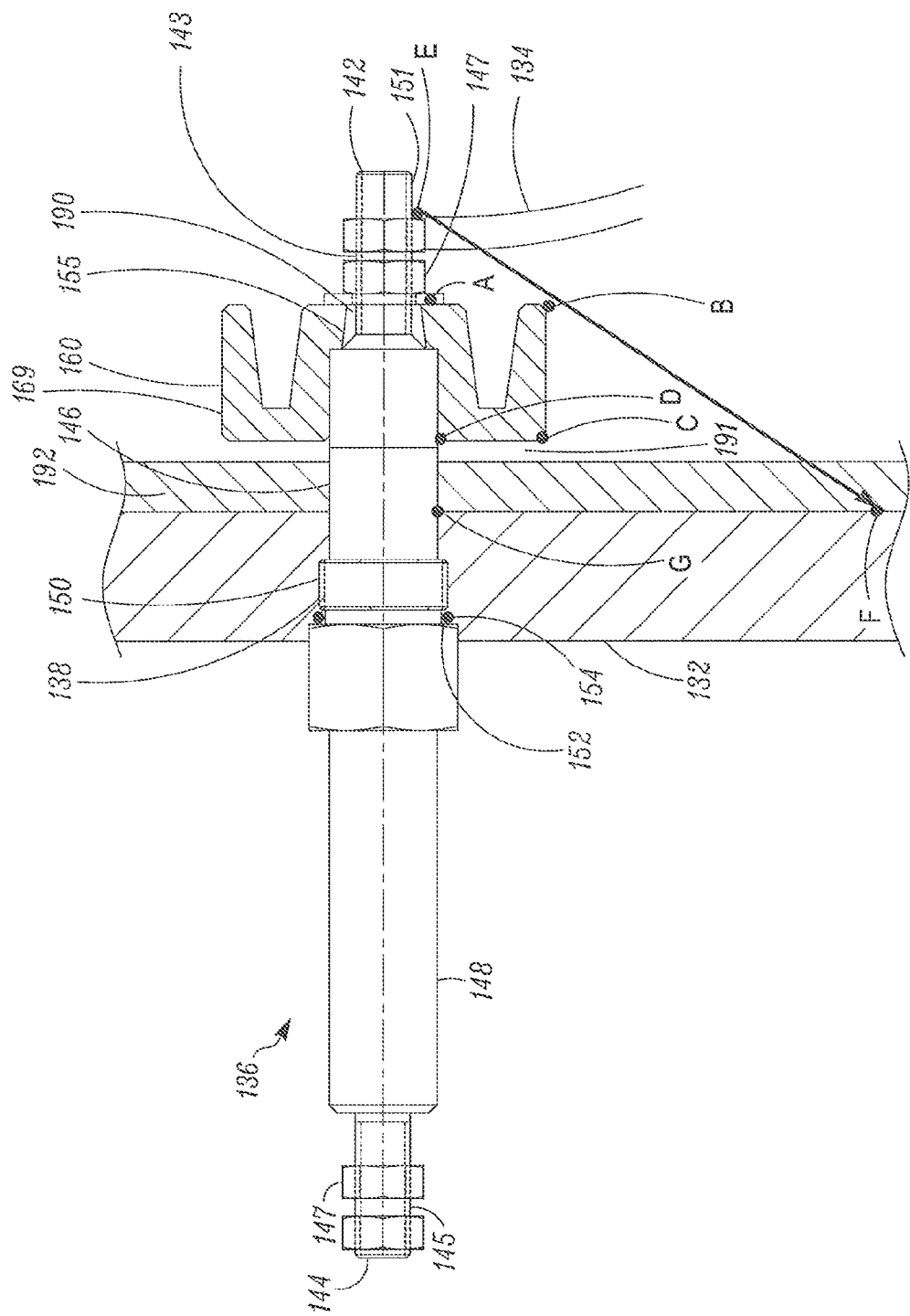
FIG. 3B is a side view of the conductive pin shown in FIG. 3A.

In the embodiment as depicted in FIGS. 2 and 3A-B, the conductive pin 136 has a synthetic resin body such as an epoxy body molded around a conductor 151, such as, but not limited to, a copper wire that may be centrally disposed for example relative to the inner segment 146, the intermediate segment 148 and/or the outer segment 150. The epoxy body is then molded into a threaded body. The conductor 151 can be a copper center wire that is exposed at both the inner post 143 and the outer post 145 for connection with the motor 120 and the external power source through leads 134, respectively. The conductor 151 such as a copper center wire exposed at the inner post 143 is electrically connected to the motor 120 through the leads 134. It is to be understood that the conductive pins can be made of other suitable conducting materials, such as stainless steel, brass, aluminum, or the like.

Referring now to FIGS. 3A-B and 4-5, the insulator 160 is disposed over the inner segment 146 of conductive pin 136 to insulate the conductor 151 such as a copper center wire exposed on the inner post 143 from the terminal board 132. The insulator 160 is configured to have a convoluted contour in its axial cross section (referring to FIGS. 3A-B and 5), thereby improving effectively over-surface and through-space insulation protection. As used herein, the term "convoluted" refers to having a lengthened surface contour caused by a back-and-forth, folded or otherwise lengthened path. For example, a "convoluted contour" can have peaks/valleys, such as for example but not by way of limitation one or more "V" shapes, thereby increasing a point to point distance along an outer surface of the insulator 160.

Figure 4:
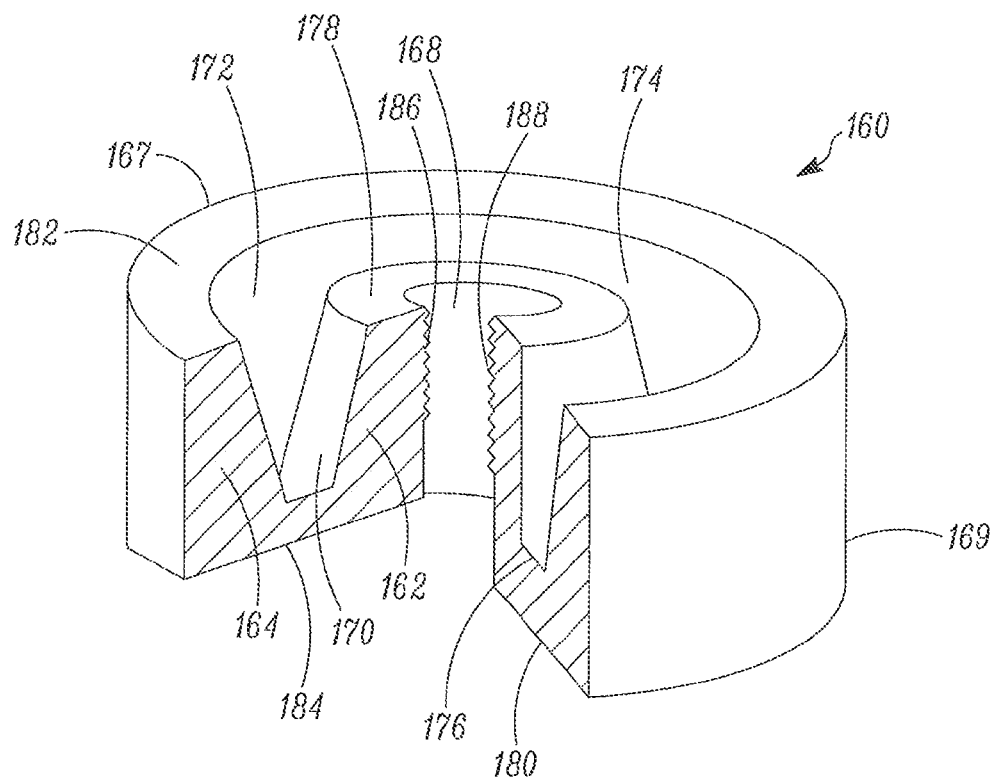
FIG. 4 is a sectional view of an insulator shown in FIG. 3A.
Figure 5:
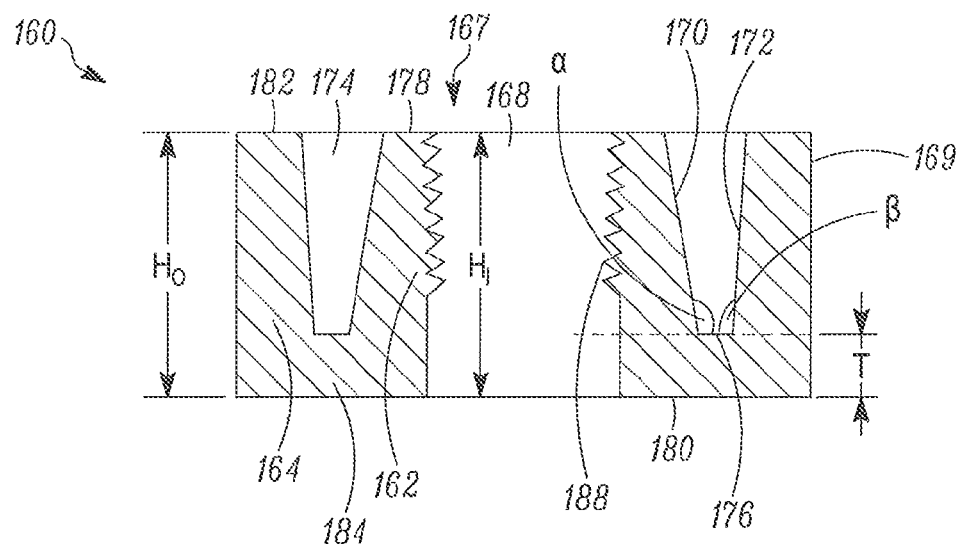
FIG. 5 is a cross section view of the insulator shown in FIG. 3A.

FIGS. 2, 3A-B and 4-5 illustrate just one of many possible designs of the insulator 160. As depicted in the figures, the insulator 160 can take a form of a convoluted washer disposed over the conductive pin 136. As shown in FIGS. 4-5, the insulator 160 has an inner radial wall 162 defining an opening 168 and an outer radial wall 164 which may be coaxial with the inner radial wall 162. An outer surface 170 of the inner radial wall 162 and an inner surface 172 of the outer radial wall 164 define an annular recess 174 which may be coaxial with the opening 168 and the inner and outer radial walls 162, 164. A threaded portion 188 is defined on an inner surface 186 of the inner radial wall 162. In the embodiment as shown in FIG. 4, the threaded portion 188 is formed on an area closer to a top side 167 of the insulator 160 to create an electrical seal in the area. However, it is to be understood that the threaded portion 188 can be constructed on other suitable areas of the surface 186. In some embodiments, no threads are formed on the surface 186. Instead, the insulator 160 can be secured by one or more nuts on the threaded portion 155 of the conductive pin 136. This can be done by a force of torqueing the one or more nuts to create an electrically insulating contact.

The inner radial wall 162 has a top surface 178 and shares a same bottom surface 180 with the outer radial wall 164. A height $H_I$ of the inner radial wall is defined between the top surface 178 and the bottom surface 180. Likewise, the outer radial wall 164 has a top surface 182, a bottom surface 180 shared with the inner radial wall 162 and a height $H_O$ defined between the top and bottom surfaces 182 and 180. In the depicted embodiment as shown in FIGS. 2-5, the height $H_I$ of the inner radial wall 162 and the height $H_O$ of the outer radial wall 164 can be identical in some cases, and the top surface 178 of the inner radial wall 162 and the top surface 182 of the outer radial wall 164 can in some cases share the same plane. However, it is to be understood that the inner radial wall 162 and the outer radial wall 164 can have different heights.

In the depicted embodiment as shown in FIGS. 4 and 5, the annular recess 174 has a bottom surface 176 oriented for example parallel with respect to the bottom surface 180 of the insulator 160. However, it is to be understood, that the orientation of the bottom surface 176 can vary as desired, e.g., it can be angled with respect to the bottom surface 180. A bottom wall 184 is formed between the bottom surface 176 of the recess 174 and the bottom surface 180 of the insulator 160. The bottom wall 184 has a thickness T defined between the bottom surface 176 of the recess 174 and the bottom surface 180 of the insulator 160. The smaller the thickness T is, the longer the over-surface distance between the inner post 143 and the terminal board 132 will be. On the other hand, a minimum thickness has to be maintained to prevent electric breakdown through the bottom wall 184 as well as to provide adequate strength to the bottom wall 184. The specific dimension of the thickness T can also be dependent upon the strength and moldability of the material of the insulator, as well as the dielectric strength of the material. The dielectric strength defines the electric field strength that the material can withstand without breaking down, and is expressed in terms of voltage per thickness of material and measured by Volts/0.001" or V/mil for instance. Electrically insulating layers can be as thin as 0.010". In some embodiments, the thickness T can be as small as about ⅛" as long as the over-surface distance allows.

Figure 8:
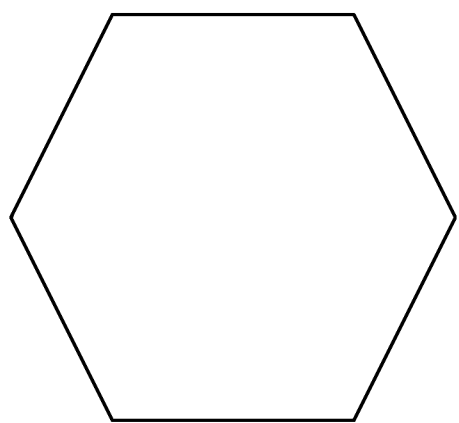
FIG. 8 is a top view of an outer contour of an insulator.

In the depicted embodiment as shown in FIGS. 4 and 5, the outer surface 170 of the inner radial wall 162 is oriented at an angle α with respect to the bottom surface 176 of the recess 174. The inner surface 172 of the outer radial wall 164 is oriented at an angle β with respect to the bottom surface 176. In the depicted embodiment, the angle α and the angle β are different. However, it is to be understood that the angle α can be the same as the angle β. In the depicted embodiment, the angles α and β are depicted as obtuse angles. Compared to right angles, the obtuse angles help increase the over-surface distance between the inner post 143 and the terminal board 132 and allow a smoother transition between the inner radial wall 162 and the outer radial wall 164. However, it is to be understood, any obtuse, right or acute angle can be employed at angles α and β as desired. In some embodiments, an outer surface 169 of the insulator 160 can be configured to have a suitable shape, for example, a hexagonal shape as shown in FIG. 8, for easy assembly or disassembly. In the embodiment depicted in FIGS. 2, 3A-B and 4-5, the outer surface 169 is circular when viewed from the top side 167.

The dimension of the insulator 160 is configured to be large enough to position the inner post 143 at an arc inhibiting distance from the terminal board 132 to increase both the over-surface distance and/or the through-space distance between the inner post 143 and the terminal board 132. As discussed above, the term "over-surface distance" refers to a geodesic distance between two points in the refrigeration system, and the term through-space distance" refers to a shortest straight line between conductor and ground. For example, as shown in FIG. 3B, an over-surface distance between the inner post 143 and the terminal board 132 can be measured by adding a distance along the outer surface 169 of the insulator 160 between point A and point B, a distance between point C and point B, a distance between point C and point D, and a distance along an outer surface of the conductive pin 136 between point D and point G. A through-space distance between the inner post 143 and the terminal board 132 can be the distance between point E and point F. In the depicted embodiment as shown in FIG. 2, an over-surface distance over the insulator 160 between the inner post 143 and the terminal board 132 is about 3½ inches, and the shortest distance (through-space distance) from the inner post 143 to the terminal board 132 is about 3 inches.

In addition to the top side 167, it should be understood that the convoluted contour can also be formed on an outer surface 169 of the insulator 160, on the bottom surface 180 of the insulator 160, or any combination of the top side 167, the outer surface 169 and/or the bottom surface 180.

The size of the insulator 160 can be adjusted by adjusting, for example, the diameter of the insulator 160, the height $H_I$ of the inner radial wall 162, or the height $H_O$ of the outer radial wall 164. Referring to FIGS. 2 and 3A-B, the dimension of the insulator 160 also helps to provide over-surface and through-space insulation protection between the inner post 143 of the conductive pin 136 and the next closest conductive pin 136, the motor housing 122 and the motor 120, respectively. In some embodiments, the insulator 160, such as a washer can be made by various molding methods, such as gravity molding or injection molding. Alternatively, the insulator 160 can also be machined from solid material.

In some embodiments, the insulator 160 can be made of various types of synthetic or plastic materials, such as synthetic resin, epoxy, polyphenyline sulphide, polyester, or the like. In such circumstances, the material can be filled with strengtheners such as fiberglass. In other embodiments, the insulator 160 can also be ceramic.

Referring to FIGS. 3A-B, the insulator 160 can also be configured to electrically seal the conductive pin 136. When the insulator 160 is retained over the conductive pin 136, an electrical seal can be formed between the surface 186 of the opening 168 and an outer surface of the conductive pin 136 to electrically insulate the conductive pin 136.

In some embodiments, the electrical seal is created by elastically or plastically deforming or otherwise creating contact that would satisfy electrical insulation requirements, the threaded portion 188 to create an electrical seal during installation of the threaded insulator 160. In some embodiments, a mating taper engagement can be used to create the electrical seal. In other embodiments, a space 190 between the conductive pin 136 and the insulator 160 is electrically sealed by filling the space 190 with adhesives or sealants, such as, but not limited to, epoxy or silicone, which can be compression fused therein. It is to be understood that other types of electrical seals, such as elastomeric seals, epoxy or similar adhesives can be used to fill the space 190 between the insulator 160 and the outer surface of the conductive pin 136 to create the electrical seal.

To assemble the terminal assembly 128, the insulator 160 can be threaded onto the conductive pin 136 and held in place with a jam nut, with a gap 191 formed between the bottom surface 180 of the insulator 160 and the inner surface of the terminal board 132. The gap 191 adds to the over-surface distance to avoid through-space discharge. In other embodiments, no gap is formed between the insulator 160 and the terminal board 132, for example, if the over-surface distance is otherwise satisfied. In such circumstances, the insulator 160 can be positioned to contact the terminal board 132 or other internal surface of the motor housing, if no terminal board is used. In such circumstances, in some embodiments, threads are not used to secure the insulator 160 on the conductive pin 136. Other retention methods, such as snap-fit connection or interference fit can be used to secure the insulator 160 on the conductive pin 136. In some embodiments, the insulator 160 can be secured by one or more nuts on the threaded portion 155 of the conductive pin 136. This can be done by torqueing the one or more nuts to create an electrically insulating contact. In such circumstances, a jam nut can also be used to secure the insulator 160 on the conductive pin 136. In some embodiments, an insulating layer 192 is formed on the inner surface of the terminal board 132 to reinforce insulation.

Figure 6:
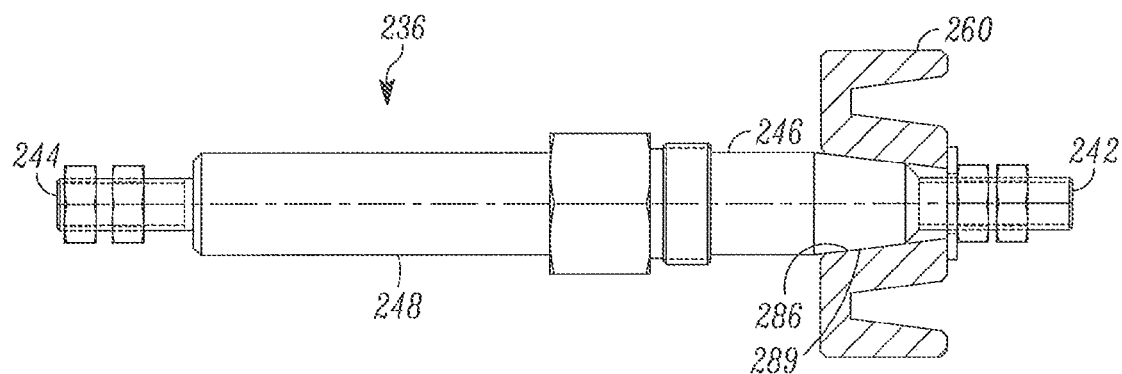
FIG. 6 is a side view of a further embodiment of the conductive pin.
Figure 7:
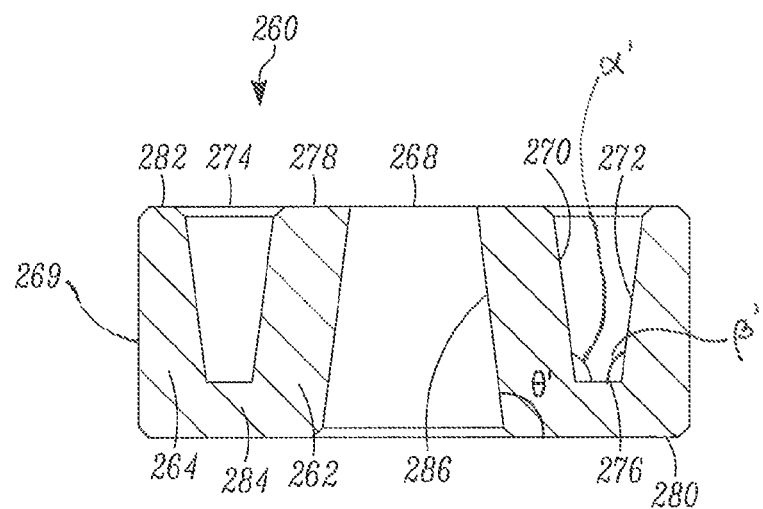
FIG. 7 is a cross section view of the insulator of shown in FIG. 6.

One example of a mating taper engagement discussed above is illustrated in FIGS. 6 and 7. In some embodiments, a convoluted insulator 260 is used with conductive pins where an electrical seal is created by a tapered portion of the convoluted insulator mating with a tapered portion of a conductive pin 236, held in place by one or more nuts threaded onto the conductor which may be centrally disposed. Referring to FIGS. 6 and 7, an inner segment 246 of a conductive pin 236 tapers toward an inner end 242 of the conductive pin 236, forming a tapered surface 289. The insulator 260 takes a form of a convoluted washer disposed over the conductive pin 236. As shown in FIG. 7, the insulator 260 has an inner radial wall 262 defining an opening 268 and an outer radial wall 264 which may be coaxial with the inner radial wall 262. An outer surface 270 of the inner radial wall 262 and an inner surface 272 of the outer radial wall 264 define an annular recess 274 which may be coaxial with the opening 268 and the inner and outer radial walls 262, 264. In some embodiments, a threaded portion can be formed on the surface 286 of the opening 268.

Referring to FIG. 7, the inner radial wall 262 has a top surface 278 and shares a same bottom surface 280 with the outer radial wall 264. Likewise, the outer radial wall 264 has a top surface 282 and a bottom surface 280 shared with the inner radial wall 262. In the depicted embodiment as shown in FIG. 7, the annular recess 274 has a bottom surface 276 oriented for example parallel with respect to the bottom surface 280 of the insulator 260. However, it is to be understood, that the orientation of the bottom surface 276 can vary as desired, e.g., it can be angled with respect to the bottom surface 280. A bottom wall 284 is formed between the bottom surface 276 of the recess 274 and the bottom surface 280 of the insulator 260.

In the depicted embodiment as shown in FIG. 7, the outer surface 270 of the inner radial wall 262 is oriented at an angle $\alpha'$ with respect to the bottom surface 276 of the recess 274, and the surface 286 of the opening 268 is also tapered such that it is oriented at an angle $\theta'$ with respect to the bottom surface 280 of the insulator 260. In some embodiments, the angle $\theta'$ is generally identical as the angle $\alpha'$ and thus the surface 286 of the opening 268 is generally parallel to the outer surface 270 of the inner radial wall 262. In other embodiments, the angle $\theta'$ is different than the angle $\alpha'$ and the surface 286 of the opening 268 is not parallel to the outer surface 270 of the inner radial wall 262. The inner surface 272 of the outer radial wall 2264 is oriented at an angle $\beta'$ with respect to the bottom surface 276. In the depicted embodiment, the angle $\alpha'$ and the angle $\beta'$ are generally the same. However, it is to be understood that the angle $\alpha'$ can be different from the angle $\beta'$.

The tapered surface 286 of the opening 268 of the insulator 260 can form a mating taper engagement with the tapered surface 289 of the conductive pin 236 to create an electrical seal. In such instances, the insulator 260 can be torqued on the tapered surface 289 of the conductive pin 236 to create an electrically insulating contact.

Aspects:

It is noted that any of aspects 1-3 below can be combined with any of aspects 4-5 and aspects 6-7. Also, any of aspects 4-5 below can be combined with any of aspects 6-7.

1. A terminal assembly for conducting current from an external power source to a hermetical motor-compressor unit, comprising:
    a terminal board;
    at least one opening defined through the thickness of the terminal board;
    at least a conductive pin received in the opening; and
    an insulator having a convoluted contour, the insulator being disposed over the conductive pin and spaced away from the terminal board.

2. The terminal assembly of aspect 1, wherein the insulator has an inner radial wall defining an insulator opening, an outer radial wall and an annular recess defined between the inner and outer radial wall, the opening being sized to receive the conductive pin.

3. The terminal assembly of aspect 1 or 2, wherein an electrical seal is formed between the insulator and the conductive pin.

4. An insulator for a terminal assembly that conducts current from an external power source to a hermetical motor-compressor unit, comprising:
    an inner radial wall defining an opening;
    an outer radial wall; and
    an annular recess defined between the inner radial wall and the outer radial wall,
    wherein the inner radial wall has a same height as the outer radial wall.

5. The insulator of aspect 5, wherein an outer surface of the inner radial wall is oriented at an obtuse angle with a bottom surface of the annular recess.

6. A method to increase both an over-surface distance and a through-space distance between a conductive pin of a terminal assembly for a hermetical motor-compressor unit, the terminal assembly including a terminal board and at least one conductive pin extending through the thickness of the terminal board, the method comprising:
    installing an insulator on a conductive pin, the insulator having a convoluted contour; and
    creating an electrical seal between the insulator and a side surface of the conductive pin.

7. The method of aspect 6, wherein the insulator has an inner radial wall defining an insulator opening, an outer radial wall and an annular recess defined between the inner and outer radial wall, the opening being sized to receive the conductive pin.

A number of embodiments of the invention have been described. Nevertheless, it will be understood that various modifications may be made without departing from the spirit and scope of the invention. Accordingly, other embodiments are within the scope of the following claims.

The invention claimed is:

1. A terminal assembly for conducting current from an external power source to a hermetical motor-compressor unit of a refrigeration system, comprising:
a terminal board;
an opening defined through the thickness of the terminal board;
a conductive pin received in the opening; and
an insulator having a convoluted contour, the insulator being disposed over the conductive pin and spaced away from the terminal board,
wherein the convoluted contour of the insulator has a back and forth lengthened path,
wherein the insulator has an inner radial wall defining an insulator opening, an outer radial wall and an annular recess defined between the inner and outer radial walls, the insulator opening being sized to receive the conductive pin,
wherein the annular recess forms the convoluted contour of the insulator,
wherein the conductive pin is configured to be insulated from the terminal board partially by refrigerant,
wherein the inner radial wall and the outer radial wall both form at least part of the convoluted contour of the insulator; a bottom surface of the inner radial wall and a bottom surface of the outer radial wall share a same plane, and a top surface of the inner radial wall and a top surface of the outer radial wall share a same plane; the two planes being positioned parallel from each other, and
wherein a gap is formed between the terminal board and a bottom surface of the insulator such that a side surface of a section of the conductive pin positioned between the terminal board and the bottom surface of the insulator is exposed to the refrigerant.

2. The terminal assembly of claim 1, wherein an inner surface of the inner radial wall is oriented generally perpendicularly relative to a bottom surface of the insulator.

3. The terminal assembly of claim 1, wherein an inner surface of the inner radial wall is oriented at a non-perpendicular angle relative to a bottom surface of the insulator.

4. The terminal assembly of claim 1, wherein an inner surface of the inner radial wall has a threaded portion for connection with the conductive pin, the threaded portion being formed on the inner surface of the inner radial wall in an area closer to a top surface of the insulator.

5. The terminal assembly of claim 1, wherein the insulator opening has a side surface without a threaded portion, while a mating engagement is formed between the side surface of the insulator opening and an outer surface of the conductive pin by a force of torqueing the insulator relative to the conductive pin to create the mating engagement.

6. The terminal assembly of claim 1, wherein the inner radial wall has a tapered inner surface engagable with an outer surface of the conductive pin to form a mating engagement, wherein the inner radial wall is tapered continuously from the top surface to the bottom surface of the inner radial wall.

7. The terminal assembly of claim 1, wherein an outer surface of the inner radial wall is oriented at an obtuse angle with a bottom surface of the annular recess, and an inner surface of the inner radial wall is oriented at an obtuse angle with a bottom surface of the insulator.

8. The terminal assembly of claim 1, wherein an inner surface of the outer radial wall is oriented at an obtuse angle with a bottom surface of the annular recess.

9. A method to increase at least one of an over-surface distance and a through-space distance between a conductive pin of a terminal assembly for a hermetical motor-compressor unit of a refrigeration system, the terminal assembly including a terminal board and at least one conductive pin extending through the thickness of the terminal board, the method comprising:
installing an insulator on a conductive pin, the insulator having a convoluted contour;
creating an electrical seal between the insulator and a side surface of the conductive pin;
insulating the conductive pin from the terminal board by refrigerant;
increasing at least one of an over-surface distance or a through-space distance by the convoluted contour of the insulator; and
forming a gap between a bottom surface of the insulator and the terminal board, thereby allowing a side surface of a section of the conductive pin positioned between the terminal board and the bottom surface of the insulator to be exposed to the refrigerant,
wherein the convoluted contour of the insulator has a back and forth lengthened path,
wherein increasing at least one of the over-surface distance or the through-space distance by the convoluted contour of the insulator including:
sharing a same plane by a bottom surface of the inner radial wall and a bottom surface of the outer radial wall, and
sharing a same plane by a top surface of the inner radial wall and a top surface of the outer radial wall,
wherein the two planes being positioned parallel from each other, and
wherein the inner radial wall and the outer radial wall both form at least part of the convoluted contour of the insulator.

10. The method of claim 9, wherein the insulator includes an outer radial wall and an inner radial wall, and an inner surface of the inner radial wall is tapered continuously from the top surface to the bottom surface of the inner radial wall, and
wherein installing the insulator on a conductive pin comprises:
disposing the insulator on the conductive pin; and
torqueing the insulator relative to the conductive pin in a continuous tapered mating engagement between the insulator and the conductive pin.

11. The terminal assembly of claim 1, wherein the insulator includes a bottom wall having a thickness of ⅛ inch.

12. The terminal assembly of claim 1, wherein the convoluted contour of the insulator is configured to provide an over-surface distance between an inner post of the conductive pin and the terminal board to be 3½ inches.

13. The terminal assembly of claim 1, wherein when viewed from a top surface of the insulator, the insulator has a hexagonal shape.

14. The terminal assembly of claim 1, wherein an entire bottom surface of the inner radial wall is leveled, and an entire bottom surface of the outer radial wall is leveled.

* * * * *